United States Patent
Mende et al.

(10) Patent No.: US 6,817,760 B2
(45) Date of Patent: Nov. 16, 2004

(54) METHOD OF MONITORING CURRENT PROBE TRANSFORMER TEMPERATURE

(75) Inventors: Michael J. Mende, Portland, OR (US); Jonathan S. Dandy, Beaverton, OR (US); Michael D. Stevens, Aloha, OR (US); Albert S. Crane, Jr., Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/667,724

(22) Filed: Sep. 22, 2003

(65) Prior Publication Data

US 2004/0101027 A1 May 27, 2004

Related U.S. Application Data

(60) Provisional application No. 60/428,649, filed on Nov. 22, 2002.

(51) Int. Cl.[7] .............................. G01K 7/36; G01R 33/00
(52) U.S. Cl. ........................ 374/152; 374/176; 374/183; 324/117 H; 324/127; 340/595
(58) Field of Search ................................. 374/152, 176, 374/177, 184, 141, 163, 183, 185; 324/127, 117 H, 130, 71.1; 702/99, 38; 340/595, 584, 646; 338/32 H

(56) References Cited

U.S. PATENT DOCUMENTS

| | | | | |
|---|---|---|---|---|
| 1,565,504 A | * | 12/1925 | Rudd et al. ................. 374/152 |
| 2,464,807 A | * | 3/1949 | Hansen, Jr. .............. 324/117 H |
| 4,327,416 A | * | 4/1982 | Jerrim ..................... 324/117 H |
| 4,623,265 A | * | 11/1986 | Poyser ........................ 374/152 |
| 4,897,584 A | * | 1/1990 | Grutzmacher et al. ...... 374/152 |
| 5,493,211 A | * | 2/1996 | Baker ......................... 324/130 |
| 6,042,265 A | * | 3/2000 | Kliman et al. .............. 374/152 |
| 6,139,181 A | * | 10/2000 | Olszowka ................... 374/152 |
| 6,204,657 B1 | * | 3/2001 | Stanley ................... 324/117 H |
| 6,400,131 B1 | * | 6/2002 | Turner ........................ 324/130 |
| 6,687,636 B2 | * | 2/2004 | Van Sant ..................... 702/99 |
| 2004/0100248 A1 | * | 5/2004 | Mende ................... 324/117 H |

* cited by examiner

Primary Examiner—Edward Lefkowitz
Assistant Examiner—Stanley J. Pruchnic, Jr.
(74) Attorney, Agent, or Firm—William K. Bucher

(57) ABSTRACT

A current probe transformer temperature monitoring method determines an initial transformer temperature of the current probe as a function of the winding resistance of the transformer. A relative temperature of the Hall Effect device is also determined as a function of resistance change of the Hall Effect device. The initial transformer temperature and the relative Hall Effect device temperature are combined to produce a continuous transformer temperature indicative of the temperature of the transformer. The current signal to the multi-turn winding is removed when the continuous transformer temperature exceeds a threshold temperature value and a visual indication may be provided.

6 Claims, 2 Drawing Sheets

METHOD OF MONITORING CURRENT PROBE TRANSFORMER TEMPERATURE

CROSS-REFERENCE TO RELATED APPLICATION

This application claims the benefit of the U.S. Provisional Application No. 60/428,649, filed Nov. 22, 2002.

BACKGROUND OF THE INVENTION

Transformer heating in current probes has always been a problem with respect to the customer's safety and the probe's reliability. Measuring higher currents at higher frequencies continues to push the envelope on what probes/amplifiers can provide. In the past, derating curves have been used to indicate the safe operating areas of the probe but could not detect situations in which a customer was exceeding the derating curves. The ability to constantly measure and monitor the temperature of the transformer allows control of the maximum temperatures that the probe can reach and limit potential damage to the probe as well as safety issues for customers. The below described invention discloses a method for monitoring the transformer temperature in current probes.

SUMMARY OF THE INVENTION

Accordingly, the present invention is a method of monitoring the temperature of a transformer winding in a current probe. The current probe includes a magnetic core having a multi-turn winding disposed there-around forming a probe transformer. A Hall Effect device is disposed within the magnetic core for generating a differential output signal for producing a current signal through the multi-turn winding. The current probe transformer temperature monitoring method determines an initial transformer temperature of the current probe as a function of the winding resistance of the transformer. A relative temperature of the Hall Effect device is also determined as a function of resistance change of the Hall Effect device. The initial transformer temperature and the relative Hall Effect device temperature are combined to produce a continuous transformer temperature indicative of the temperature of the transformer. The current signal to the multi-turn winding is removed when the continuous transformer temperature exceeds a threshold temperature value and a visual indication may be provided.

The initial transformer temperature determining step includes the steps of storing the thermal coefficient of copper, $\alpha$, an initial transformer temperature, $T_0$, and a termination resistance, $R_{termination}$, in memory. Digital values representative of an input voltage, Vin, to the multi-turn winding and an output voltage, Vout, from the multi-turn winding are generated and an initial probe resistance, $R_0$, is calculated using the termination resistance and the digital values of the input and output voltages. The initial transformer temperature, $T_{probe}$, is calculated using the function:

$$T_{probe} = T_0 + \frac{1}{\alpha}\left(\frac{R_{termination}(Vin - Vout) - R_0 Vout}{R_0 Vout}\right)$$

The relative temperature of the Hall Effect device determining step includes the steps of storing a thermal coefficient of resistance value of the Hall Effect device, $\alpha_H$, a Hall Effect device bias voltage source value, $V_{Bias+}$, and a resistance bias value, $R_{Bias}$, in memory. A digital value representative of a voltage, $V_{Hall+}$, across the Hall Effect device is generated and an initial Hall Effect device resistance value, $R_{Hall}$, calculated using the function:

$$R_{Hall} = \left(\frac{2 \times V_{Hall+} R_{Bias}}{V_{Bias+} - V_{Hall+}}\right)$$

and stored in memory as $R_{Hall\ Init.}$. Additional digital values representative of the voltage, $V_{Hall+}$, are generated and Hall Effect resistance values, $R_{Hall}$, representing changes in the resistance of the Hall Effect device as a function of temperature are calculated. Changes in temperature of the Hall Effect device, $\Delta T_{probeHall}$, are calculated using the function:

$$\Delta T_{probeHall} = \frac{1}{\alpha_H}\left(\frac{R_{Hall} - R_{Hall\ Init.}}{R_{Hall\ Init.}}\right)$$

temperature value.

Alternately, the first order equation may be modified to include first and second order terms, $k_1$ and $k_2$, to increase the accuracy of the change in temperature calculation.

$$\Delta T_{probeHall} = k_1(R_{Hall} - R_{Hall\ Init.}) + k_2(R_{Hall} - R_{Hall\ Init.})^2$$

The objects, advantages and novel features of the present invention are apparent from the following detailed description when read in conjunction with appended claims and attached drawings.

BRIEF DESCRIPTION OF THE DRAWING FIGURES

DETAILED DESCRIPTION OF THE PREFERRED EMBODIMENT

Figure 1:
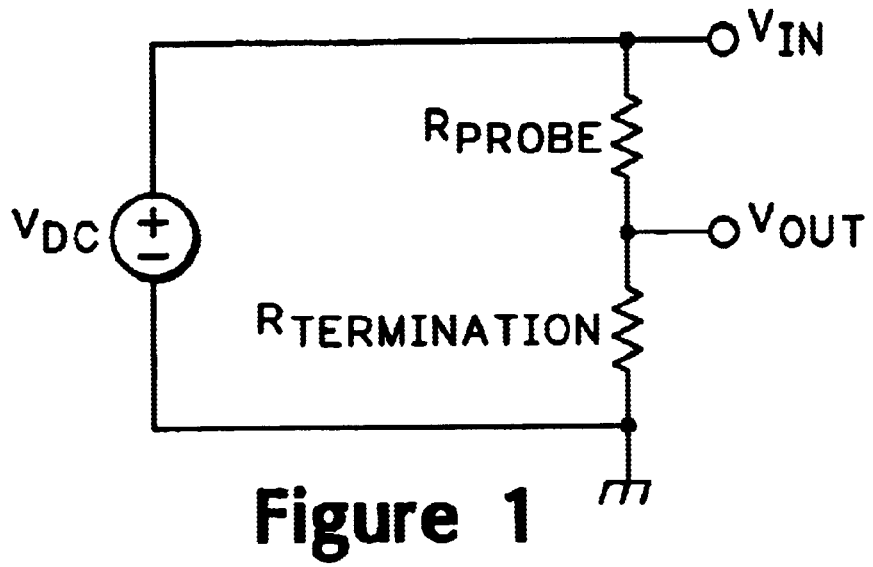
FIG. 1 is a representative schematic diagram of the probe transformer and termination resistance forming a voltage divider network in a current probe incorporating the method of monitoring current probe transformer temperature according to the present invention.

A first measurement uses the winding resistance of the probe transformer as an indication of the transformer temperature. The probe transformer resistance and termination resistance, as shown in FIG. 1, form a voltage divider. With a known termination resistance, $R_{termination}$, Vin and Vout, $R_{probe}$ can be calculated. This resistance is directly related to the wire temperature. For example, with copper, $\alpha$, the thermal coefficient of resistance, is ~0.38% per degree C. With an initial probe resistance, $R_0$, at an initial temperature of $T_0$, the temperature of the probe transformer, $T_{probe}$, can be calculated as follows:

$$T_{probe} = T_0 + \frac{1}{\alpha}\left(\frac{R_{termination}(Vin - Vout) - R_0 Vout}{R_0 Vout}\right) \quad (1)$$

Figure 2:
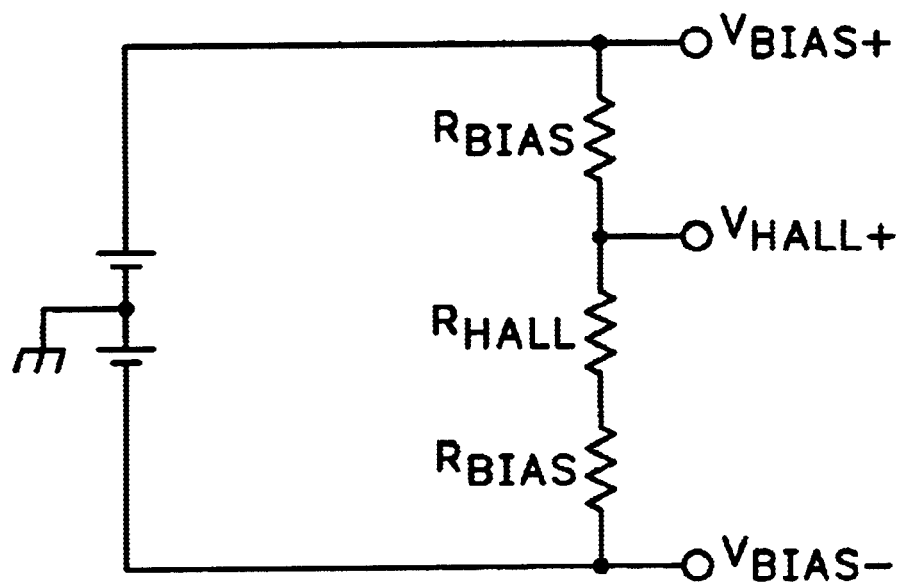
FIG. 2 is a representative schematic diagram of the Hall Effect device and Hall bias source resistor forming a voltage divider network in a current probe incorporating the method of monitoring current probe transformer temperature according to the present invention.

A second measurement takes advantage of the thermal properties of a Hall device. As the temperature of the Hall device increases, the resistance of the device, $R_{Hall}$, decreases, see FIG. 2. By measuring the voltage across the Hall device, two times $V_{Hall+}$, $R_{Hall}$ can be calculated.

$$R_{Hall} = \left(\frac{2 \times V_{Hall+} R_{Bias}}{V_{Bias+} - V_{Hall+}}\right) \quad (2)$$

With an initial Hall device resistance, $R_{Hall\ Init}$, at a specific temperature, $T_{probe}$, and a thermal coefficient of resistance of the Hall device, $\alpha_H$ (% per degree C.), the change in temperature can be calculated as follows:

$$\Delta T_{probeHall} = \frac{1}{\alpha_H}\left(\frac{R_{Hall} - R_{Hall\ Init.}}{R_{Hall\ Init.}}\right) \quad (3)$$

Due to Hall device characteristic variations, this measurement is best used for relative temperature changes only.

Alternately, the first order equation (3) may be modified to include first and second order terms, $k_1$ and $k_2$, to increased accuracy of the change in temperature calculation. The first and second order terms, $k_1$ and $k_2$, are empirically derived by measuring the Hall Effect device resistance over a range of temperatures. The values of the first and second order terms will vary depending on the manufacturer of the Hall Effect device.

$$\Delta T_{probeHall} = k_1(R_{Hall} - R_{Hall\ Init.}) + k_2(R_{Hall} - R_{Hall\ Init.})^2 \quad (4)$$

Using the results of the calculations above that establish the absolute temperature of the transformer, $T_{probe}$, and the relative temperature measurement based on the Hall device resistance, $\Delta T_{probe\ Hall}$, the continuous temperature of the transformer can be monitored.

$$T_{probe\ continuous} = T_{probe} + \Delta T_{probe\ Hall} \quad (5)$$

The combination of these two measurements provide a means to accurately and constantly measure the temperature of the probe's transformer. Because the transformer winding resistance is calculated when the current through the transformer is known and constant during the Vin and Vout measurements, it is not useful during normal operation of the probe, However, this method can be used during the self-calibration routine (that must be run with no input signal) to determine the transformer temperature. The Hall sensor resistance $R_{Hall\ Init}$, can also be calculated during this routine, Since the Hall resistance can be calculated during normal operation, the temperature of the transformer may always be determined. The system can then react to the overheating of the transformer by shutting down the circuit and/or giving the user feedback via a visual or audio indicator.

Figure 3:
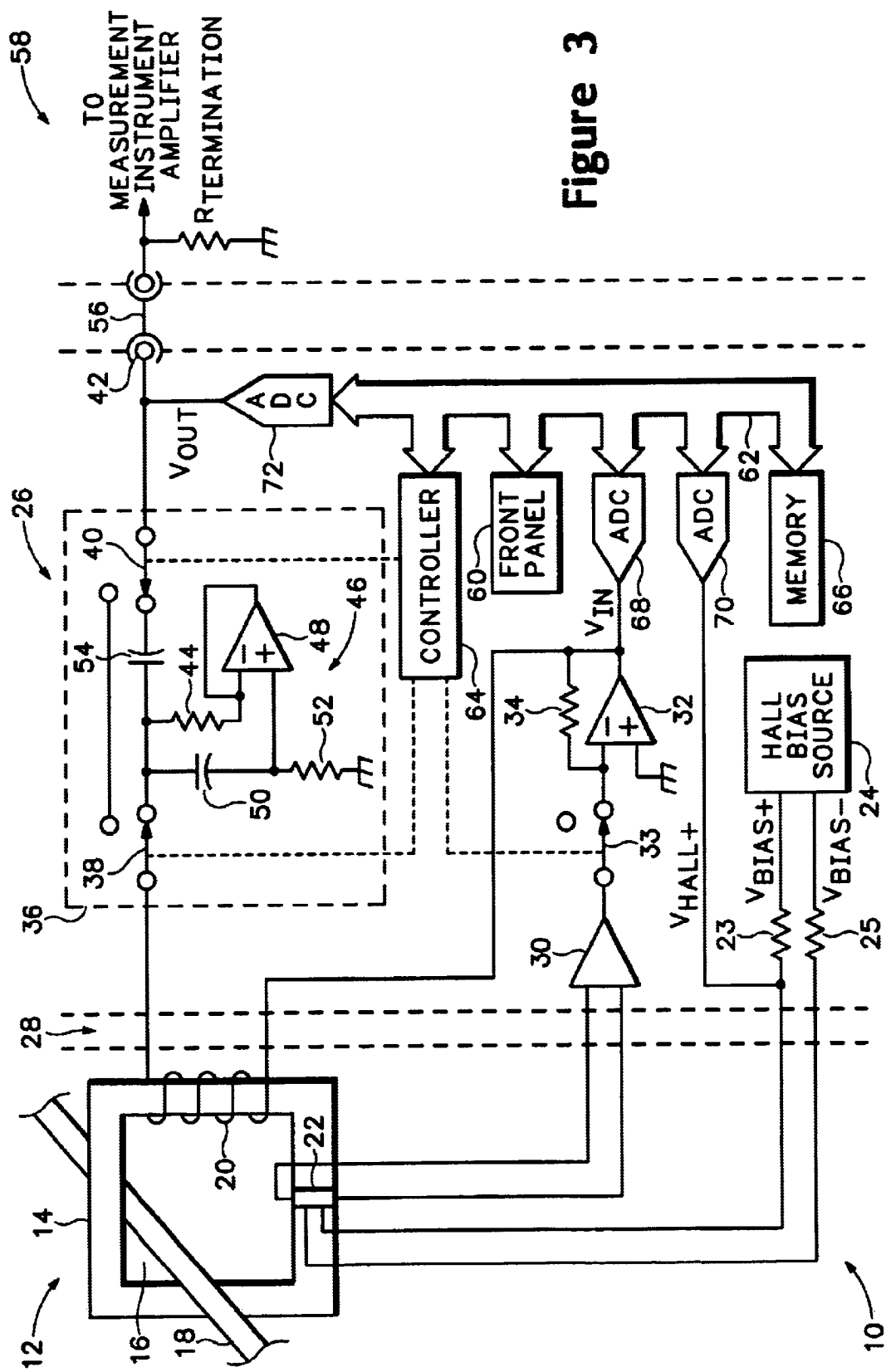
FIG. 3 is a block diagram of a current probe incorporating the method of monitoring current probe transformer temperature according to the present invention.

FIG. 3 illustrates a simplified AC/DC current probe system 10 having a current probe 12 with a split core 14 of magnetic material defining an aperture 16 through which a conductor 18 carrying a current to be measured extends. A multi-turn winding 20 is wrapped around one leg of the core 14 forming a probe transformer. A thin film semiconductor Hall Effect device 22 is disposed within the magnetic core 14. A bias source 24 housed in a current probe amplifier 26 provides power for the Hall Effect device 22 via resistor 23 and 25 and a multi-conductor cable 28 coupled to a connector on the front panel 60 of the current probe amplifier 26. The Hall Effect device 22 provides a differential input signal to a Hall pre-amplifier 30 in the current probe amplifier 26 via the multi-conductor cable 28. The output of the Hall pre-amplifier 30 is coupled through switch 33 and applied to a power amplifier 32 that is provided with a feedback resistor 34. The output of the power amplifier 32 is connected via the multi-conductor cable 28 to one end of the multi-turn winding 20 and the opposite end of the winding 20 is connected via the multi-conductor cable 28 to an AC/DC switching circuit 36. The switching circuit 36 has input and output switches 38 and 40 that either directly couples the current signal from the current probe 12 to the output terminal 42 of the current probe amplifier 26 or AC couples the signal to the output terminal 42 of the current probe amplifier 26. The AC coupling circuit has a DC terminating shunt resistor 44 coupled to receive the current input from the current probe 12. The DC terminating shunt resistor 44 is coupled in series with a high inductive value synthesized inductor 46. The synthesized inductor 46 is preferably an operational amplifier 48 having its inverting input node directly coupled to the output node of the amplifier. The DC terminating shunt resistor 44 is coupled to the inverting input node of the amplifier 48. The non-inverting node of the operation amplifier 48 is coupled to the junction between a shunt capacitor 50 that is coupled in parallel with the shunt resistor 44 and the synthesized inductor 46 and a termination resistor 52. The other end of the shunt capacitor 50 is coupled to receive the input from the current probe 12. The current signal is coupled through coupling capacitor 54 to the output switch 40. The output switch 40 is coupled to the output terminal 42, which in turn is coupled via a coaxial cable 56 to the input of a measurement test instrument 58, such as an oscilloscope or the like. The coaxial cable 56 includes a TekProbe-BNC interface, manufactured and sold by Tektronix, Inc., Beaverton, Oreg. providing a serial bus from the measurement instrument 58 to the current probe amplifier 26.

The current probe amplifier 26 includes a front panel 60 having buttons, knob, LEDs and the like for controlling the operation of the amplifier and connectors for coupling the current probe 12 and measurement test instrument 58 to the amplifier 26. The front panel circuitry is coupled via controller bus 62 to the a controller 64. The controller bus 62 is also coupled to memory 66 that store parameter values and program instruction executed by the controller 64. The memory 66 may be separate RAM and ROM semiconductor devices or a part of the controller 64. The controller bus 62 is also coupled to an analog-to-digital converter (ADC) 68 that is coupled to the output of the power amplifier 32. The controller bus is coupled to a second ADC 70 that is coupled to the positive bias output of the Hall bias source 24. The controller bus is coupled to a third ADC 72 that is coupled to the output of the current probe amplifier 26. The front panel 60 includes buttons, knob, LEDs and the like for controlling the operation of the amplifier and has connectors for coupling the current probe 12 and measurement test instrument 58 to the amplifier 26. Depressing the appropriate buttons on the current probe amplifier 26 apply signals to a controller 64 that selectively couple the DC or AC signal path between the input and output of the current probe amplifier 26 and the current probe transformer temperature measurement system.

The resistance of the current probe windings 20 $R_0$ is measured at an arbitrary temperature, which in the preferred embodiment is 23° C. and stored in memory 66 as well as the thermal coefficient of resistance for copper, the thermal coefficient of resistance of the Hall device, the voltage of $V_{Bias+}$, the $R_{Bias}$ resistance, and the termination resistance $R_{termination}$. The controller 64 executes routines stored in memory 66 to determine the temperature of the probe transformer using equation 1. The probe transformer temperature and the Hall sensor resistance is calculated during a degaussing progress initiated by the user from the front panel 60. The termination resistance $R_{termination}$ is the value of the termination resistor in the measurement instrument, which in the preferred embodiment is 50 ohms. The ADC 68 converts the Vin voltage at the input of the winding 20 to a digital value for processing by the controller 64. The ADC 72 converts the Vout voltage at the input of the winding 20 to a digital value for processing by the controller 64. The calculated temperature of the probe is stored in memory 66.

The controller 64 further executes routines stored in memory 66 to determine the resistance of the Hall device using equation 2. The ADC 70 converts the $V_{Hall+}$ voltage at the Hall device 22 to a digital value for processing by the controller 64. The controller 64 processes the acquired and stored data and generates a resistance value $R_{Hall}$ that is stored in memory 66 as $R_{Hall\ Init}$. The controller 64 executes routines stored in memory 66 to continuously monitor the temperature of the Hall device acquiring digital data samples of the $V_{Hall+}$ voltage and executing equation 3. The controller 64 executes additional routines stored in memory 66 to continuously calculate the temperature of probe transformer using equation 4. If the temperature of the probe transformer exceeds a threshold value stored in memory 66, the controller 64 initiates a command the cause switch 33 to open and disconnect the Hall device output from the power amplifier 32. This prevents current from flowing through the probe transformer windings 20. The controller 64 further initiates a signal to an LED on the front panel 60 that causes the LED to flash to indicate to the user that the probe transformer has exceeded the safe temperature limit.

The present invention has been described with a current probe amplifier 26 having memory 66 that stores constants, variables and executable routines that implement the current probe transformer temperature monitoring method. The current probe amplifier 26 may also use the serial bus associated with the coaxial cable 56 to download executable routines and constants from the measurement instrument 58.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method of monitoring the temperature of a transformer winding in a current probe wherein the current probe includes a magnetic core having a multi-turn winding disposed there-around forming a probe transformer and a Hall Effect device disposed within the magnetic core for generating a differential output signal for producing a current signal through the multi-turn winding, the method comprising:

determining an initial transformer temperature of the current probe as a function of the winding resistance of the transformer;

determining a relative temperature of the Hall Effect device as a function of resistance change of the Hall Effect device; and combining the initial transformer temperature and the relative Hall Effect device temperature to produce a continuous transformer temperature indicative of the temperature of the transformer.

2. The method of monitoring the temperature of a transformer winding in a current probe as recited in claim 1 further comprising the step of removing the current signal from the multi-turn winding when the continuous transformer temperature exceeds a threshold temperature value.

3. The method of monitoring the temperature of a transformer winding in a current probe as recited in claim 2 further comprising the step of providing a visual indication when the continuous transformer temperature exceeds a threshold temperature value.

4. The method of monitoring the temperature of a transformer winding in a current probe as recited in claim 1 wherein the initial transformer temperature determining step further comprises the steps of:

storing the thermal coefficient of copper, $\alpha$, an initial transformer temperature, $T_0$, and a termination resistance, $R_{termination}$, in memory;

generating digital values representative of an input voltage, Vin, to the multi-turn winding and an output voltage, Vout, from the multi-turn winding;

calculating an initial probe resistance, $R_0$, using the termination resistance and the digital values of the input and output voltages; and calculating the initial transformer temperature, $T_{probe}$, using the function $$T_{probe} = T_0 + \frac{1}{\alpha}\left(\frac{R_{termination}(Vin - Vout) - R_0 Vout}{R_0 Vout}\right).$$

5. The method of monitoring the temperature of a transformer winding in a current probe as recited in claim 1 wherein the relative temperature of the Hall Effect device determining step further comprises the steps of:

storing a thermal coefficient of resistance value of the Hall Effect device, $\alpha_H$, a Hall Effect device bias voltage source value, $V_{Bias+}$, and a resistance bias value, $R_{Bias}$, in memory;

generating a digital value representative of a voltage, $V_{Hall+}$, across the Hall Effect device;

calculating an initial Hall Effect device resistance value, $R_{Hall}$, using the function $$R_{Hall} = \left(\frac{2 \times V_{Hall+} R_{Bias}}{V_{Bias+} - V_{Hall+}}\right)$$

and storing the resistance value in memory as $R_{Hall\ Init.}$;

generating additional digital values representative of the voltage, $V_{Hall+}$ and calculating Hall Effect resistance values, $R_{Hall}$, representing changes in the resistance of the Hall Effect device as a function of temperature; and calculating changes in temperature of the Hall Effect device, $\Delta T_{probeHall}$, using the function $$\Delta T_{probeHall} = \frac{1}{\alpha_H}\left(\frac{R_{Hall} - R_{Hall\ Init.}}{R_{Hall\ Init.}}\right).$$

6. The method of monitoring the temperature of a transformer winding in a current probe as recited in claim 1 wherein the relative temperature of the Hall Effect device determining step further comprises the steps of:

storing first and second thermal coefficient of resistance values of the Hall Effect device, $k_1$ and $k_2$, a Hall Effect device bias voltage source value, $V_{Bias+}$, and a resistance bias value, $R_{Bias}$, in memory;

generating a digital value representative of a voltage, $V_{Hall+}$, across the Hall Effect device;

calculating an initial Hall Effect device resistance value, $R_{Hall}$, using the function $$R_{Hall} = \left( \frac{2 \times V_{Hall+} R_{Bias}}{V_{Bias+} - V_{Hall+}} \right)$$

and storing the resistance value in memory as $R_{Hall\ Init.}$; generating additional digital values representative of the voltage, $V_{Hall+}$ and calculating Hall Effect resistance values, $R_{Hall}$, representing changes in the resistance of the Hall Effect device as a function of temperature; and calculating changes in temperature of the Hall Effect device, $\Delta T_{probeHall}$, using the function $\Delta T_{probeHall} = k_1 (R_{Hall} - R_{Hall\ Init.}) + k_2 (R_{Hall} - R_{Hall\ Init.})^2$.

* * * * *